(12) United States Patent
Pringle, IV et al.

(10) Patent No.: US 11,583,886 B2
(45) Date of Patent: Feb. 21, 2023

(54) ROBOT END EFFECTOR WITH ROTATING BARREL FOR DISPENSING AN EXTRUDABLE SUBSTANCE

(71) Applicant: The Boeing Company, Chicago, IL (US)

(72) Inventors: John Walter Pringle, IV, Torrance, CA (US); Angelica Davancens, Reseda, CA (US); Dehwei Hsu, Cypress, CA (US); Derek Nelson, Long Beach, CA (US); Steve Andres Sandoval, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/470,559

(22) Filed: Sep. 9, 2021

(65) Prior Publication Data

US 2022/0288621 A1 Sep. 15, 2022

Related U.S. Application Data

(60) Provisional application No. 63/161,197, filed on Mar. 15, 2021.

(51) Int. Cl.
| | | |
|---|---|---|
| *B05C 5/02* | (2006.01) | |
| *B25J 15/00* | (2006.01) | |
| *B01F 25/42* | (2022.01) | |
| *B01F 101/00* | (2022.01) | |

(52) U.S. Cl.
CPC .......... *B05C 5/0225* (2013.01); *B01F 25/42* (2022.01); *B25J 15/0019* (2013.01); *B01F 2101/2305* (2022.01)

(58) Field of Classification Search
CPC . B05C 5/0225; B05C 11/1036; B05C 5/0216; B01F 25/42; B01F 2101/2305; B25J 15/0019
See application file for complete search history.

(56) References Cited

U.S. PATENT DOCUMENTS

| | | | | |
|---|---|---|---|---|
| 4,433,795 | A * | 2/1984 | Maiefski | G07F 13/065 222/14 |
| 9,316,216 | B1 * | 4/2016 | Cook | F04B 13/02 |
| 2004/0255560 | A1 * | 12/2004 | Noble | B29B 7/80 53/469 |
| 2016/0114348 | A1 * | 4/2016 | Cheung | B05C 5/0225 222/333 |

(Continued)

*Primary Examiner* — Vishal Pancholi
(74) *Attorney, Agent, or Firm* — Kwan & Olynick LLP

(57) ABSTRACT

A robot end effector (100) for dispensing an extrudable substance (102) comprises a chassis (110), a static mixer (101), and cartridge bays (122), extending from the chassis (110). Each of the cartridge bays (122) is shaped to receive a corresponding one of the two-part cartridges (104). Fluidic communication between the selected one of the two-part cartridges (104) and the static mixer (101) is established when the cartridge bays (122) are rotated about an axis (190) to a predetermined orientation with respect to the chassis (110). The robot end effector (100) also comprises a dispensing valve (130), attached to the chassis (110), and a head assembly (150), comprising an inlet manifold (152). The inlet manifold (152) is configured to selectively supply compressed air from a pressure source (199) to contents of a corresponding one of the two-part cartridges (104).

20 Claims, 8 Drawing Sheets

(56) References Cited

U.S. PATENT DOCUMENTS

| | | | |
|---|---|---|---|
| 2018/0045745 A1* | 2/2018 | Holmes | B01L 3/0279 |
| 2019/0151882 A1* | 5/2019 | Tritt | G05B 15/02 |
| 2020/0222319 A1* | 7/2020 | Rönnback | B01F 33/84 |

* cited by examiner

ROBOT END EFFECTOR WITH ROTATING BARREL FOR DISPENSING AN EXTRUDABLE SUBSTANCE

CROSS-REFERENCE TO RELATED APPLICATIONS

This application claims the benefit under 35 U.S.C. § 119(e) of U.S. Provisional Patent Application 63/161,197, filed on 2021 Mar. 15, which is incorporated herein by reference in its entirety for all purposes.

TECHNICAL FIELD

Described herein are apparatuses and methods for depositing an extrudable substance onto a surface.

BACKGROUND

During assembly of a structure, such as a solar panel or a component of an aircraft or a spacecraft, an extrudable substance must often be deposited from a two-part cartridge onto a surface of the structure. It is desirable to fully automate such deposition of the extrudable substance to reduce cost and manufacturing lead time. It also desirable to use commercial off-the-shelf two-part cartridges to reduce cost. However, in many instances, each commercial off-the-shelf two-part cartridge yields only a relatively small amount of the extrudable substance. In such instances, automation of the deposition process is limited by a frequent need to pause the automated system to manually replace an empty two-part cartridge with a full cartridge.

SUMMARY

Accordingly, apparatuses and methods, intended to address at least the above-identified concerns, would find utility.

The following is an example, useful for understanding the subject matter, disclosed herein.

Disclosed herein is a robot end effector for dispensing an extrudable substance. The robot end effector comprises a chassis and a mixer housing, extending from the chassis and configured to receive a static mixer. The static mixer comprises a mixer inlet and a mixer outlet, which is in fluidic communication with the mixer inlet. The mixer housing is selectively movable, with respect to the chassis, linearly along an axis. The robot end effector also comprises cartridge bays, extending from the chassis. Each of the cartridge bays is shaped to receive a corresponding one of two-part cartridges. Each one of the two-part cartridges comprises a cartridge outlet. The cartridge bays are rotatable, with respect to the chassis, about the axis. Fluidic communication between the cartridge outlet of a corresponding one of the two-part cartridges and the mixer inlet is established when the cartridge bays are rotated about the axis to a predetermined orientation relative to the chassis, and the mixer housing is translated along the axis relative to the chassis so that the cartridge outlet of a corresponding one of the two-part cartridges and the mixer inlet are fluidically coupled with each other. The robot end effector further comprises a dispensing valve, attached to the chassis and comprising a valve inlet and a valve outlet. The valve outlet is in selective fluidic communication with the valve inlet. The valve inlet and the mixer outlet are configured to be in fluidic communication with each other. The robot end effector also comprises a head assembly, comprising an inlet manifold. The inlet manifold is selectively movable, with respect to the chassis, linearly along the axis. The head assembly is configured to selectively supply compressed air from a pressure source to contents of the selected one of the two-part cartridges via the inlet manifold when the two-part cartridges are received by the cartridge bays, the cartridge bays are in the predetermined orientation relative to the chassis, and the inlet manifold is translated along the axis so that the pressure source is capable of pressurizing the contents of the selected one of the two-part cartridges.

The robot end effector provides for depositing the extrudable substance from the two-part cartridges in a single automated deposition process, eliminating a need to pause, recover, and reload the robot end effector each time a single two-part cartridge is emptied. The cartridge bays enable loading and retention of the two-part cartridges on the robot end effector. The cartridge bays configured to move a selected one of the two-part cartridges to the predetermined orientation with respect to the chassis and the static mixer, such that the cartridge outlet of the selected one of the two-part cartridges is aligned with the mixer inlet of the static mixer, enables each two-part cartridge to be selectively positioned for extrusion of the contents into the static mixer in one-at-a-time fashion. The head assembly distributes pressure from the pressure source to each of the two-part cartridges selectively to enable extrusion of the extrudable substance selectively from the two-part cartridge that is in the predetermined orientation for fluid communication with the static mixer. Once the selected one of the two-part cartridges has been emptied of the extrudable substance, the cartridge bays are configured to move a next selected one of the two-part cartridges to the predetermined orientation with respect to the chassis and the static mixer such that the cartridge outlet of the next selected one of the two-part cartridges is aligned with the mixer inlet of the static mixer. The mixer housing is configured to hold the static mixer firmly in position against the cartridge outlet during extrusion from the selected one of the two-part cartridges.

BRIEF DESCRIPTION OF THE DRAWINGS

Reference will now be made to the accompanying drawings, which are not necessarily drawn to scale, and where like reference characters designate the same or similar parts throughout the several views. In the drawings.

DETAILED DESCRIPTION

Figure 1:
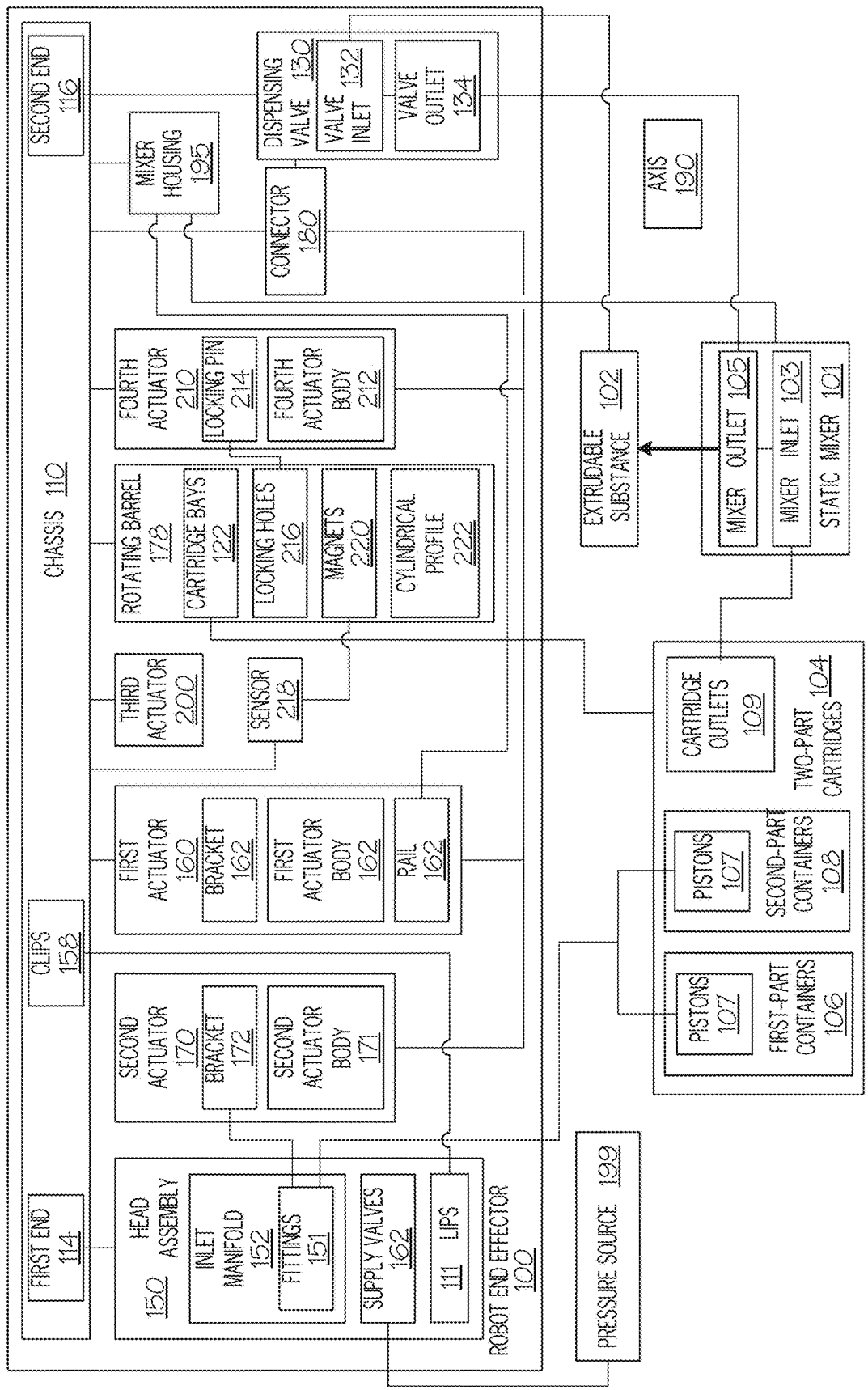
FIG. 1 is a block diagram of a robot end effector for dispensing an extrudable substance, according to one or more examples of the subject matter, disclosed herein.

In FIG. 1, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the subject matter, disclosed herein. Likewise, elements and/or components, if any, represented with dashed lines, indicate alternative examples of the subject matter, disclosed herein. One or more elements shown in solid and/or dashed lines may be omitted from a particular example without departing from the scope of the subject matter, disclosed herein. Environmental elements, if any, are represented with dotted lines. Virtual (imaginary) elements may also be shown for clarity. Those skilled in the art will appreciate that some of the features illustrated in FIG. 1 may be combined in various ways without the need to include other features described in FIG. 1, other drawing figures, and/or the accompanying disclosure, even though such combination or combinations are not explicitly illustrated herein. Similarly, additional features not limited to the examples presented, may be combined with some or all of the features shown and described herein.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one or more examples" means that one or more feature, structure, or characteristic described in connection with the example is included in at least one implementation. The phrase "one or more examples" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Figure 3:
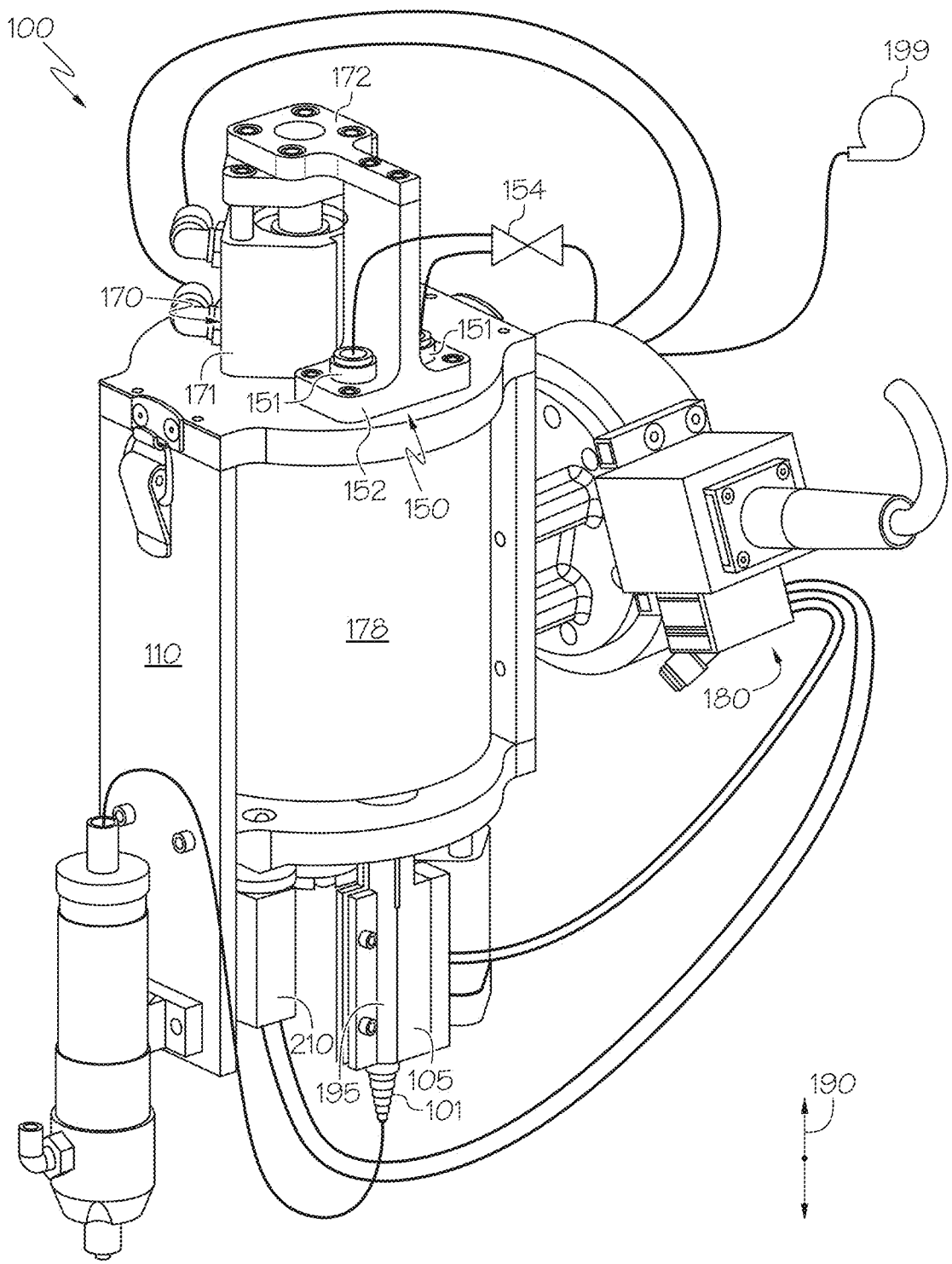
FIG. 3 is a schematic, perspective view of the robot end effector of FIG. 1, according to one or more examples of the subject matter, disclosed herein.
Figure 4B:
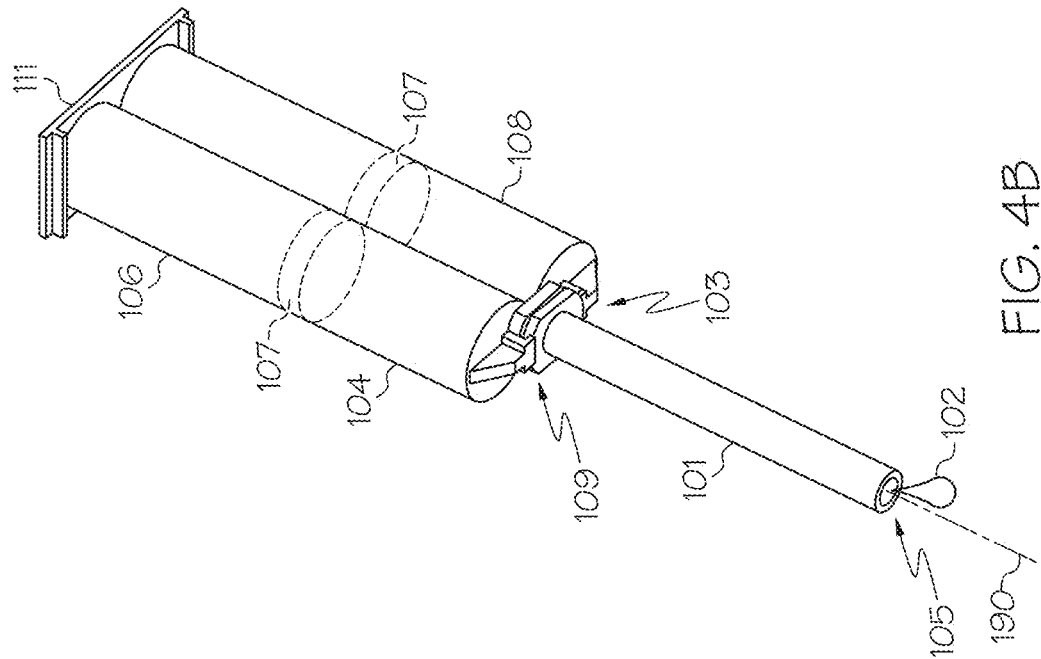
FIG. 4B is a schematic, perspective, assembled view of the two-part cartridge and static mixer of FIG. 4A, according to one or more examples of the subject matter, disclosed herein.
Figure 4A:
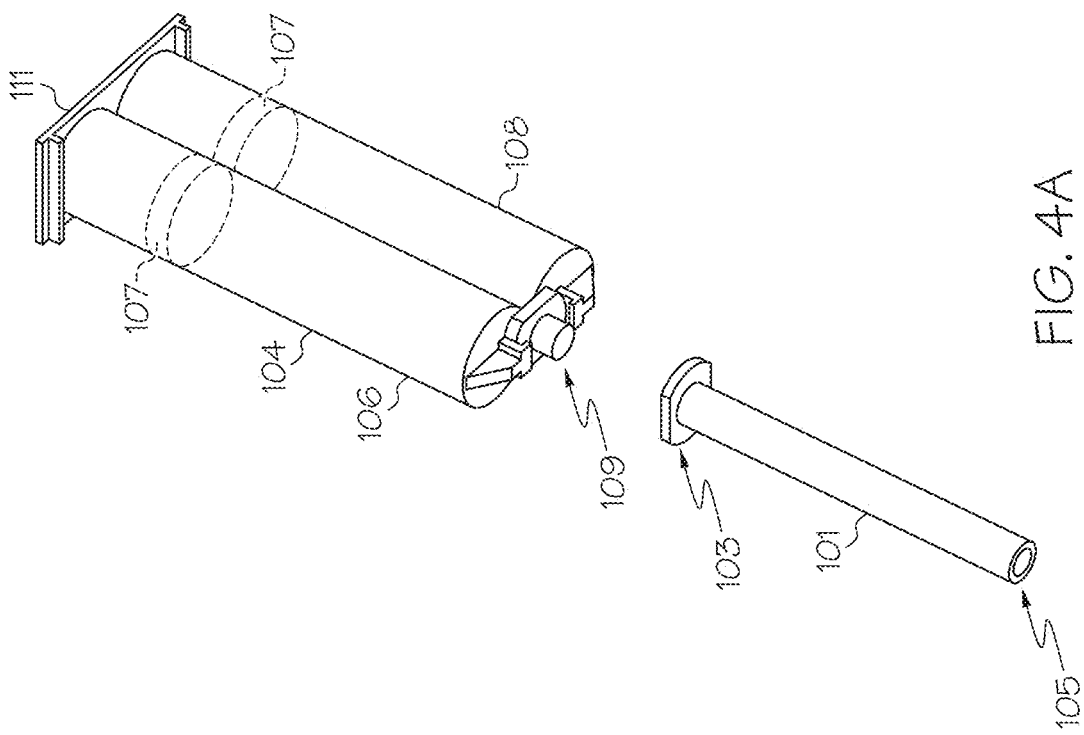
FIG. 4A is a schematic, perspective, exploded view of a two-part cartridge and static mixer for use with the robot end effector of FIG. 1, according to one or more examples of the subject matter, disclosed herein.

For purposes of this disclosure, "along" means "coaxial with or parallel to." Tubes and hoses shown in FIG. 3 are omitted from the other figures for clarity.

Illustrative, non-exhaustive examples, useful for understanding the subject matter, disclosed herein, are provided below.

Referring generally to FIG. 1 and particularly to, e.g., FIGS. 2-7 for illustrative purposes only and not by way of limitation, robot end effector 100 for dispensing extrudable substance 102 is disclosed. Robot end effector 100 comprises chassis 110 and mixer housing 195, extending from chassis 110 and configured to receive static mixer 101. Static mixer 101 comprises mixer inlet 103 and mixer outlet 105, which is in fluidic communication with mixer inlet 103. Mixer housing 195 is selectively movable, with respect to chassis 110, linearly along axis 190. Robot end effector 100 also comprises cartridge bays 122, extending from chassis 110. Each of cartridge bays 122 is shaped to receive a corresponding one of two-part cartridges 104. Each one of two-part cartridges 104 comprises cartridge outlet 109. Cartridge bays 122 are rotatable, with respect to chassis 110, about axis 190. Fluidic communication between cartridge outlet 109 of a corresponding one of two-part cartridges 104 and mixer inlet 103 is established when cartridge bays 122 are rotated about axis 190 to a predetermined orientation relative to chassis 110 and mixer housing 195 is translated along axis 190 relative to chassis 110 so that cartridge outlet 109 of a corresponding one of two-part cartridges 104 and mixer inlet 103 are fluidically coupled with each other. Robot end effector 100 further comprises dispensing valve 130, attached to chassis 110 and comprising valve inlet 132 and valve outlet 134. Valve outlet 134 is in selective fluidic communication with valve inlet 132. Valve inlet 132 and mixer outlet 105 are configured to be in fluidic communication with each other. Robot end effector 100 also comprises head assembly 150, comprising inlet manifold 152. Inlet manifold 152 is selectively movable, with respect to chassis 110, linearly along axis 190. Head assembly 150 is configured to selectively supply compressed air from pressure source 199 to contents of a selected one of two-part cartridges 104 via inlet manifold 152 when two-part cartridges 104 are received by cartridge bays 122, cartridge bays 122 are in the predetermined orientation relative to chassis 110, and inlet manifold 152 is translated along axis 190 so that pressure source 199 is capable of pressurizing the contents of the selected one of two-part cartridges 104. The preceding portion of this paragraph delineates example one of the subject matter, disclosed herein.

Robot end effector 100 provides for depositing extrudable substance 102 from two-part cartridges 104 in a single automated deposition process, eliminating a need to pause, recover, and reload robot end effector 100 each time a single two-part cartridge is emptied. Cartridge bays 122 enable loading and retention of two-part cartridges 104 on robot end effector 100. Cartridge bays 122 configured to move a selected one of two-part cartridges 104 to the predetermined orientation with respect to chassis 110 and static mixer 101, such that cartridge outlet 109 of the selected one of two-part cartridges 104 is aligned with mixer inlet 103 of static mixer 101, enables each of two-part cartridges 104 to be selectively positioned for extrusion of the contents into static mixer 101 in one-at-a-time fashion. Head assembly 150 distributes pressure from pressure source 199 selectively to each of two-part cartridges 104 via inlet manifold 152 to enable extrusion of extrudable substance 102 selectively from one of two-part cartridges 104 that is in the predetermined orientation for fluid communication with static mixer 101. Once the selected one of two-part cartridges 104 has been emptied of extrudable substance 102, cartridge bays 122 are configured to rotate the next selected one of two-part cartridges 104 to the predetermined orientation with respect to chassis 110 and static mixer 101 such that cartridge outlet 109 of the next selected one of two-part cartridges 104 is aligned with mixer inlet 103 of static mixer 101.

In one or more examples, two-part cartridges 104 are commercial off-the-shelf items that each include first-part container 106 and second-part container 108. The contents of first-part container 106 and the contents of second-part container 108 are configured to be mixed together to yield extrudable substance 102, such as an adhesive. Typically, the contents of first-part container 106 and second-part container 108 must be kept separate until just before use because extrudable substance 102 solidifies soon after mixing, for example in less than an hour. First-part container 106 and second-part container 108 each include piston 107 disposed internally within and configured to force the respective contents of first-part container 106 and second-part container 108 out of cartridge outlet 109. Static mixer is typically packaged with a two-part cartridge and is a tube, attachable to cartridge outlet 109. Static mixer typically includes mixing vanes, configured to enhance mixing of the contents of first-part container 106 and second-part container 108 as they travel through the static mixer, such that extrudable substance 102 is suitably homogeneous upon exit from mixer outlet 105 of static mixer 101.

Figure 2:
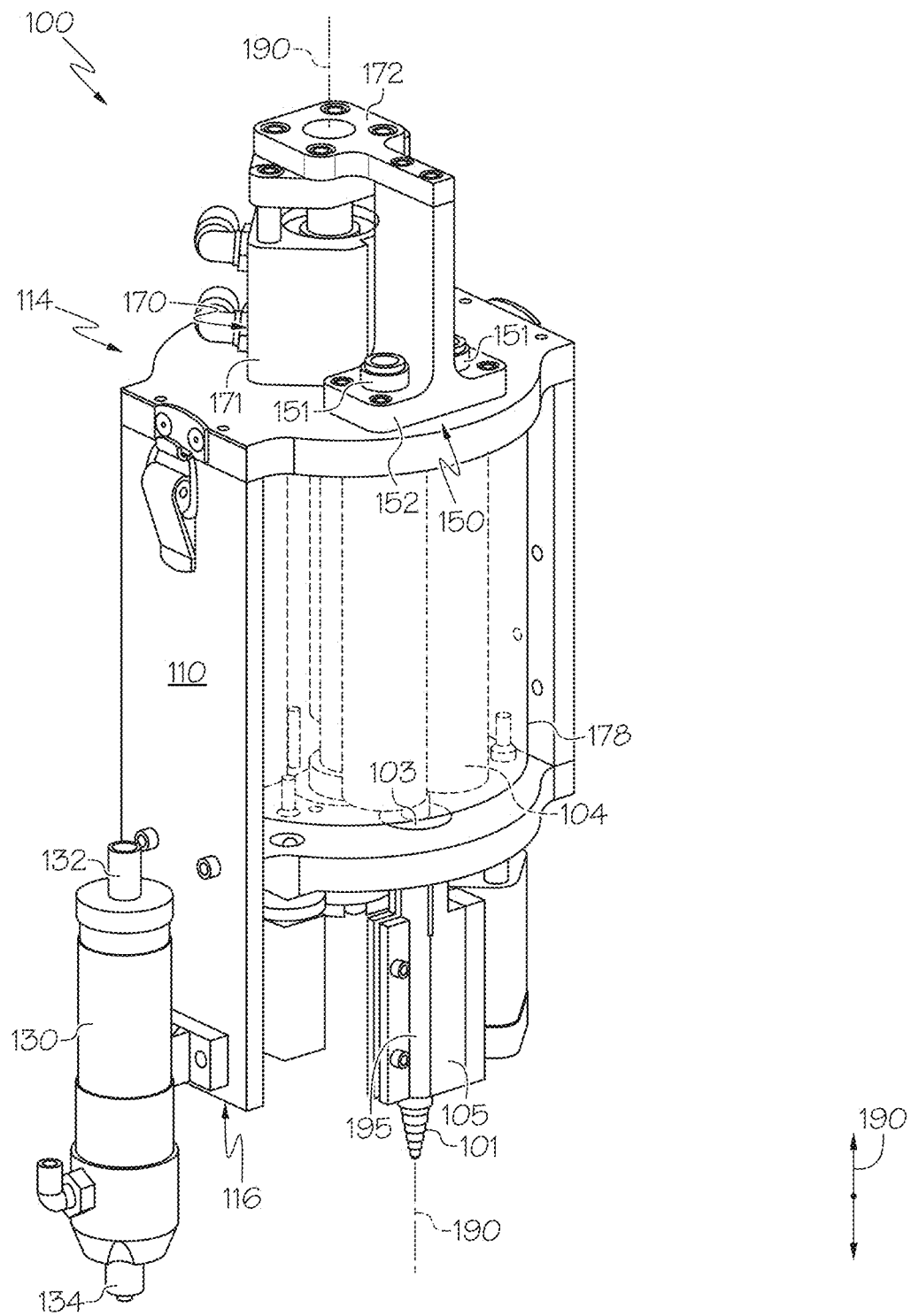
FIG. 2 is a schematic, perspective view of the robot end effector of FIG. 1, according to one or more examples of the subject matter, disclosed herein.
Figure 7:
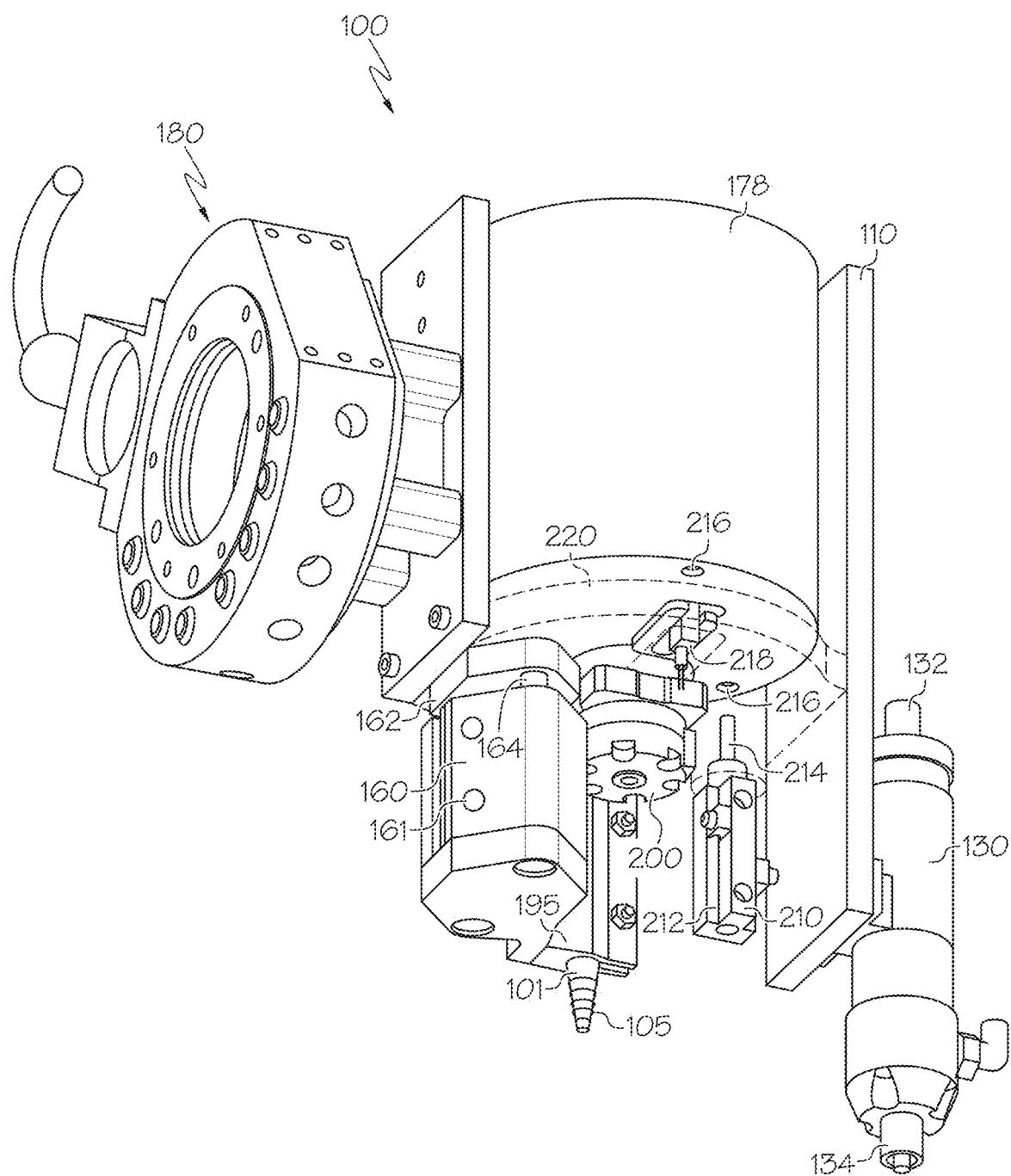
FIG. 7 is a schematic, perspective, view of a portion of the robot end effector of FIG. 1, showing a static mixer, a first actuator, a dispensing valve, a third actuator, a fourth actuator, and a connector of the robot end effector, according to one or more examples of the subject matter, disclosed herein.

Referring generally to FIG. 1 and particularly to, e.g., FIGS. 2, 3, and 7, mixer housing 195 is selectively movable, with respect to chassis 110, linearly along axis 190, between, inclusively, a mating location and a cleared location. When mixer housing 195 is in the mating location with respect to chassis 110, and static mixer 101 is received in mixer housing 195, mixer inlet 103 of static mixer 101 is positioned for mating with cartridge outlet 109 of a corresponding one of two-part cartridges 104, received by cartridge bays 122. When mixer housing 195 is in the cleared location with respect to chassis 110, mixer inlet 103 is spaced away from cartridge outlet 109 of a corresponding one of two-part cartridges 104. The preceding portion of this paragraph delineates example two of the subject matter, disclosed herein, where example two also encompasses example one, above.

Mixer housing 195 is movable linearly along axis 190 such that, when a selected one of cartridge bays 122 is moved into alignment with static mixer 101, mixer housing 195 is movable along axis 190 into and out of fluid communication with cartridge outlet 109. Specifically, mixer housing 195 is movable between the mating location and the cleared location to enable mixer housing 195 to move along axis 190 into and out of fluid communication with cartridge outlet 109.

Referring generally to FIG. 1 and particularly to, e.g., FIGS. 3 and 7, robot end effector 100 further comprises first actuator 160, attached to chassis 110 and operable to move mixer housing 195 bi-directionally with respect to chassis 110, linearly along axis 190 between the mating location and the cleared location with respect to chassis 110. The preceding portion of this paragraph delineates example three of the subject matter, disclosed herein, where example three also encompasses example two, above.

First actuator 160 enables bi-directional movement of mixer housing 195 relative to chassis 110 along axis 190 such that, when a selected one of cartridge bays 122 is moved into alignment with static mixer 101, mixer housing 195 is movable along axis 190 into and out of fluid communication with cartridge outlet 109.

Referring generally to FIG. 1 and particularly to, e.g., FIG. 7, first actuator 160 comprises first actuator body 161, bracket 162, fixed to chassis 110, and at least one rail 164, fixed to mixer housing 195 and first actuator body 161 and oriented parallel to axis 190. At least one rail 164, first actuator body 161, and mixer housing 195 are coupled to bracket 162 and movable relative to bracket 162 linearly along axis 190. The preceding portion of this paragraph delineates example four of the subject matter, disclosed herein, where example four also encompasses example three, above.

First actuator 160 includes first actuator body 161, bracket 162, and at least one rail 164 that enable bi-directional movement of mixer housing 195 relative to chassis 110 along axis 190 such that, when a selected one of cartridge bays 122 is moved into alignment with static mixer 101, mixer housing 195 is movable along axis 190 into and out of fluid communication with cartridge outlet 109.

Referring generally to FIG. 1 and particularly to, e.g., FIG. 7, first actuator 160 is pneumatically activated. The preceding portion of this paragraph delineates example five of the subject matter, disclosed herein, where example five also encompasses any one of examples three or four, above.

Pneumatic actuation of first actuator 160 enables accurate positioning of mixer housing 195 along axis 190 in a relatively inexpensive fashion, for example using air supplied through connector 180 of robot end effector 100.

Referring generally to FIG. 1 and particularly to, e.g., FIGS. 2-6, head assembly 150 is arranged to connect pistons 107 of any one of two-part cartridges 104, associated with cartridge outlet 109 of a corresponding one of two-part cartridges 104, in fluidic communication with pressurization source 199. The preceding portion of this paragraph delineates example six of the subject matter, disclosed herein, where example six also encompasses any one of examples one to five, above.

Head assembly 150 is operable to selectively establish fluidic communication between pressurization source 199 and pistons 107 of any one of two-part cartridges 104 associated with cartridge outlet 109 of a corresponding one of two-part cartridges 104 to enable each of two-part cartridges 104 to be pressurized, in one-at-a-time fashion, when the corresponding one of cartridge bays 122, in which a given one of two-part cartridges 104 is received, is selectively moved to the predetermined orientation to establish fluidic communication with static mixer 101.

Referring generally to FIG. 1 and particularly to, e.g., FIG. 3, head assembly 150 further comprises supply valve 154, operable to selectively establish fluidic communication between pressure source 199 and inlet manifold 152. The preceding portion of this paragraph delineates example seven of the subject matter, disclosed herein, where example seven also encompasses any one of examples one to six, above.

Supply valve 154 is operable to selectively establish fluidic communication between pressure source 199 and inlet manifold 152 to enable each of two-part cartridges 104 to be pressurized, in one-at-a-time fashion, when the corresponding one of cartridge bays 122, in which a given one of two-part cartridges 104 is received, is selectively moved to the predetermined orientation to establish fluidic communication with static mixer 101.

Referring generally to FIG. 1 and particularly to, e.g., FIGS. 2, 3, and 5-6, inlet manifold 152 comprises pair of fittings 151. The preceding portion of this paragraph delineates example eight of the subject matter, disclosed herein, where example eight also encompasses any one of examples two to seven, above.

Inlet manifold 152 includes pair of fittings 151 operable to selectively establish fluidic communication between pressure source 199 and inlet manifold 152 to enable each of two-part cartridges 104 to be pressurized, in one-at-a-time fashion, when the corresponding one of cartridge bays 122, in which a given one of two-part cartridges 104 is received, is selectively moved to the predetermined orientation to establish fluidic communication with static mixer 101.

Referring generally to FIG. 1 and particularly to, e.g., FIG. 3, head assembly 150 further comprises supply valve 154, operable to selectively establish fluidic communication between pressurization source 199 and a corresponding one of pair of fittings 151. The preceding portion of this paragraph delineates example nine of the subject matter, disclosed herein, where example nine also encompasses example eight, above.

Supply valve 154 is operable to selectively establish fluidic communication between pressure source 199 and a corresponding one of pair of fittings 151 to enable each of two-part cartridges 104 to be pressurized, in one-at-a-time fashion, when the corresponding one of cartridge bays 122, in which a given one of two-part cartridges 104 is received, is selectively moved to the predetermined orientation to establish fluidic communication with static mixer 101.

Referring generally to FIG. 1 and particularly to, e.g., FIGS. 2, 3, and 5-6, pair of fittings 151 is movable, with respect to chassis 110, linearly along axis 190 between a closed position and an open position. In the closed position, pair of fittings 151 is coupled with the selected one of two-part cartridges 104. In the open position, pair of fittings 151 is decoupled from the selected one of two-part cartridges 104. The preceding portion of this paragraph delineates example ten of the subject matter, disclosed herein, where example ten also encompasses example eight, above.

Moving pair of fittings 151 between a closed position, coupling pair of fittings 151 with the selected one of two-part cartridges 104, and an open position, decoupling pair of fittings 151 from the selected one of two-part cartridges 104 enables each of two-part cartridges 104 to be pressurized, in one-at-a-time fashion, when the corresponding one of cartridge bays 122, in which a given one of two-part cartridges 104 is received, is selectively moved to the predetermined orientation to establish fluidic communication with static mixer 101.

Referring generally to FIG. 1 and particularly to, e.g., FIGS. 2, 3, and 5-6, robot end effector 100 further comprises second actuator 170, attached to head assembly 150 and operable to selectively move inlet manifold 152 and pair of fittings 151 bi-directionally with respect to head assembly 150, linearly along axis 190 between the closed position and the open position. The preceding portion of this paragraph delineates example eleven of the subject matter, disclosed herein, where example eleven also encompasses example ten, above.

Second actuator 170 being operable to bi-directionally move inlet manifold 152 and pair of fittings 151 relative to head assembly 150 along axis 190 enables each of two-part cartridges 104 to be pressurized, in one-at-a-time fashion, when the corresponding one of cartridge bays 122, in which a given one of two-part cartridges 104 is received, is selectively moved to the predetermined orientation to establish fluidic communication with static mixer 101.

Referring generally to FIG. 1 and particularly to, e.g., FIGS. 2, 3, and 5-6, second actuator 170 comprises second actuator body 171, fixed to head assembly 150, and bracket 172, fixed to inlet manifold 152 and to pair of fittings 151. Bracket 172, inlet manifold 152, and pair of fittings 151 are coupled to second actuator body 171 and are movable relative to second actuator body 171 linearly along axis 190. The preceding portion of this paragraph delineates example twelve of the subject matter, disclosed herein, where example twelve also encompasses example eleven, above.

Second actuator 170 includes second actuator body 171 and bracket 172 to enable bi-directional movement of inlet manifold 152 and pair of fittings 151 relative to second actuator body 171 along axis 190 such that each of two-part cartridges 104 to be pressurized, in one-at-a-time fashion, when the corresponding one of cartridge bays 122, in which a given one of two-part cartridges 104 is received, is selectively moved to the predetermined orientation to establish fluidic communication with static mixer 101.

Referring generally to FIG. 1 and particularly to, e.g., FIGS. 2, 3, and 5-6, second actuator 170 is pneumatically activated. The preceding portion of this paragraph delineates example thirteen of the subject matter, disclosed herein, where example thirteen also encompasses example twelve, above.

Pneumatic actuation of second actuator 170 enables accurate positioning of head assembly 150 along axis 190 in a relatively inexpensive fashion, for example using air supplied through connector 180 of robot end effector 100.

Referring generally to FIG. 1 and particularly to, e.g., FIG. 7, robot end effector 100 further comprises third actuator 200, attached to chassis 110 and operable to selectively rotate cartridge bays 122 with respect to chassis 110, about axis 190. The preceding portion of this paragraph delineates example fourteen of the subject matter, disclosed herein, where example fourteen also encompasses any one of examples ten to thirteen, above.

Third actuator 200 being operable to selectively rotate cartridge bays 122 with respect to chassis 110 about axis 190 enables a selected one of cartridge bays 122 to be moved into alignment with static mixer 101 such that each of two-part cartridges 104 to be pressurized, in one-at-a-time fashion, when the corresponding one of cartridge bays 122, in which a given one of two-part cartridges 104 is received, is selectively moved to the predetermined orientation to establish fluidic communication with static mixer 101.

Referring generally to FIG. 1 and particularly to, e.g., FIG. 7, third actuator 200 is pneumatically activated. The preceding portion of this paragraph delineates example fifteen of the subject matter, disclosed herein, where example fifteen also encompasses example fourteen, above.

Pneumatic actuation of third actuator 200 enables accurate positioning of cartridge bays 122 about axis 190 in a relatively inexpensive fashion, for example using air supplied through connector 180 of robot end effector 100.

Referring generally to FIG. 1 and particularly to, e.g., FIGS. 2, 3, 5, and 7, robot end effector 100 further comprises rotating barrel 178, defining cartridge bays 122. The preceding portion of this paragraph delineates example sixteen of the subject matter, disclosed herein, where example sixteen also encompasses example fourteen, above.

Cartridge bays 122 defined in rotating barrel 178 facilitate easy insertion and removal of two-part cartridges 104 from robot end effector 100.

Referring generally to FIG. 1 and particularly to, e.g., FIG. 7, third actuator 200 is operable to selectively rotate rotating barrel 178 to selectively move cartridge bays 122, with respect to chassis 110, about axis 190. The preceding portion of this paragraph delineates example seventeen of the subject matter, disclosed herein, where example seventeen also encompasses example sixteen, above.

Third actuator 200 being operable to selectively rotate rotating barrel 178 to selectively move cartridge bays 122 with respect to chassis 110 about axis 190 enables a selected one of cartridge bays 122 to be moved into alignment with static mixer 101 such that each of two-part cartridges 104 to be pressurized, in one-at-a-time fashion, when the corresponding one of cartridge bays 122, in which a given one of two-part cartridges 104 is received, is selectively moved to the predetermined orientation to establish fluidic communication with static mixer 101.

Referring generally to FIG. 1 and particularly to, e.g., FIGS. 3 and 7, robot end effector 100 further comprises fourth actuator 210, attached to chassis 110 and operable to rotationally lock rotating barrel 178 with respect to chassis 110. The preceding portion of this paragraph delineates example eighteen of the subject matter, disclosed herein, where example eighteen also encompasses example sixteen, above.

Fourth actuator 210 being operable to selectively rotationally lock rotating barrel 178 with respect to chassis 110 about axis 190 enables a selected one of cartridge bays 122 to be moved into alignment with static mixer 101 such that each of two-part cartridges 104 to be pressurized, in one-at-a-time fashion, when the corresponding one of cartridge bays 122, in which a given one of two-part cartridges 104 is received, is selectively moved to the predetermined orientation to establish fluidic communication with static mixer 101.

Referring generally to FIG. 1 and particularly to, e.g., FIGS. 3 and 7, fourth actuator 210 comprises fourth actuator body 212, fixed to chassis 110, and locking pin 214, movably attached to fourth actuator body 212. Locking pin 214 is movable relative to fourth actuator body 212, linearly along axis 190, to rotationally lock rotating barrel 178 with respect to chassis 110. The preceding portion of this paragraph delineates example nineteen of the subject matter, disclosed herein, where example nineteen also encompasses example eighteen, above.

Locking pin 214 is movably attached to fourth actuator body 212 and operable to selectively rotationally lock rotating barrel 178 with respect to chassis 110 about axis 190 enables a selected one of cartridge bays 122 to be moved into alignment with static mixer 101 such that each of two-part cartridges 104 to be pressurized, in one-at-a-time fashion, when the corresponding one of cartridge bays 122, in which a given one of two-part cartridges 104 is received, is selectively moved to the predetermined orientation to establish fluidic communication with static mixer 101.

Referring generally to FIG. 1 and particularly to, e.g., FIG. 7, rotating barrel 178 defines locking holes 216. Locking pin 214 extends into one of locking holes 216 to rotationally lock rotating barrel 178 with respect to chassis 110. The preceding portion of this paragraph delineates example twenty of the subject matter, disclosed herein, where example twenty also encompasses example nineteen, above.

Locking pin 214 extends into locking hole 216 of locking holes 216 to selectively rotationally lock rotating barrel 178 with respect to chassis 110 about axis 190 enables a selected one of cartridge bays 122 to be moved into alignment with static mixer 101 such that each of two-part cartridges 104 to be pressurized, in one-at-a-time fashion, when the corresponding one of cartridge bays 122, in which a given one of two-part cartridges 104 is received, is selectively moved to the predetermined orientation to establish fluidic communication with static mixer 101.

Referring generally to FIG. 1 and particularly to, e.g., FIG. 7, fourth actuator 210 is pneumatically activated. The preceding portion of this paragraph delineates example twenty-one of the subject matter, disclosed herein, where example twenty-one also encompasses example nineteen, above.

Pneumatic actuation of fourth actuator 210 enables accurate positioning of cartridge bays 122 about axis 190 in a relatively inexpensive fashion, for example using air supplied through connector 180 of robot end effector 100.

Referring generally to FIG. 1 and particularly to, e.g., FIG. 7, robot end effector 100 further comprises sensor 218, fixed to chassis 110 and operable to detect a rotational position of rotating barrel 178 with respect to chassis 110. The preceding portion of this paragraph delineates example twenty-two of the subject matter, disclosed herein, where example twenty-two also encompasses example nineteen, above.

Sensor 218 enables accurate positioning of cartridge bays 122 about axis 190 in a relatively inexpensive fashion, for example using air supplied through connector 180 of robot end effector 100.

Referring generally to FIG. 1 and particularly to, e.g., FIG. 7, sensor 218 comprises a homing sensor. The preceding portion of this paragraph delineates example twenty-three of the subject matter, disclosed herein, where example twenty-three also encompasses example twenty-two, above.

Homing sensor enables accurate positioning of cartridge bays 122 about axis 190 in a relatively inexpensive fashion, for example using air supplied through connector 180 of robot end effector 100.

Referring generally to FIG. 1 and particularly to, e.g., FIG. 7, rotating barrel 178 comprises magnets 220, and sensor 218 is operable to detect one of magnets 220 to determine a rotational position of rotating barrel 178 with respect to chassis 110. The preceding portion of this paragraph delineates example twenty-four of the subject matter, disclosed herein, where example twenty-four also encompasses examples twenty-two or twenty-three, above.

Detection of magnets 220 with sensor 218 enables accurate positioning of cartridge bays 122 about axis 190 in a relatively inexpensive fashion, for example using air supplied through connector 180 of robot end effector 100.

Referring generally to FIG. 1 and particularly to, e.g., FIGS. 3 and 7, robot end effector 100 further comprises connector 180, attached to chassis 110, first actuator 160, and second actuator 170. First actuator 160 is attached to chassis 110 and operable to move mixer housing 195 bi-directionally with respect to chassis 110, linearly along axis 190, between the mating location and the cleared location with respect to chassis 110. Second actuator 170 is attached to head assembly 150 and operable to selectively move inlet manifold 152 and fittings 151 bi-directionally with respect to head assembly 150, linearly along axis 190, between the closed position and the open position. Dispensing valve 130, first actuator 160, second actuator 170, third actuator 200, and fourth actuator 210 are controllable by signals, received through connector 180. The preceding portion of this paragraph delineates example twenty-five of the subject matter, disclosed herein, where example twenty-five also encompasses example twenty-four, above.

Connector 180 facilitates simple and efficient electrical connection of dispensing valve 130, first actuator 160, second actuator 170, third actuator 200, and fourth actuator 210 to a source of control signals. In one or more examples, the control signals control first actuator 160, second actuator 170, third actuator 200, and fourth actuator 210 to move cartridge bays 122 relative to chassis 110 about axis 190 to the predetermined orientation with respect to chassis 110 and static mixer 101, and/or to decouple cartridge outlet 109 from mixer inlet 103 and move the next one of cartridge bays 122 into alignment with static mixer 101. In one or more examples, the control signals control dispensing valve 130 to deposit extrudable substance 102 via valve outlet 134.

In one or more examples, connector 180 is a quick-change connector, configured to interface mechanically with an arm of a robot (not shown), so as to attach robot end effector 100 physically to the robot, and electrically with a control system (not shown) of the robot, so as to enable and integrate control of dispensing valve 130, first actuator 160, and second actuator 170 with the control logic of the robot.

Figure 5:
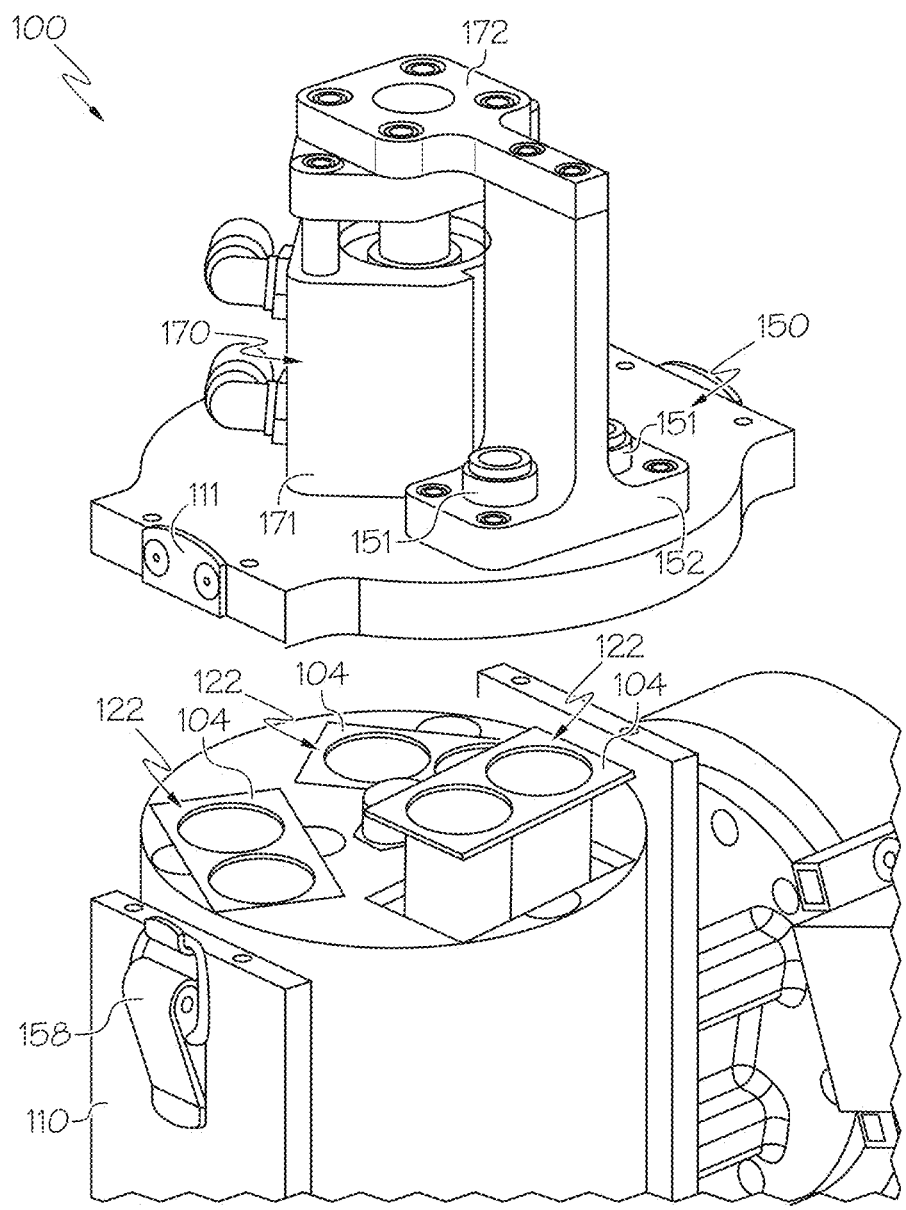
FIG. 5 is a schematic, perspective, exploded view of a portion of the robot end effector of FIG. 1, according to one or more examples of the subject matter, disclosed herein.
Figure 6A:
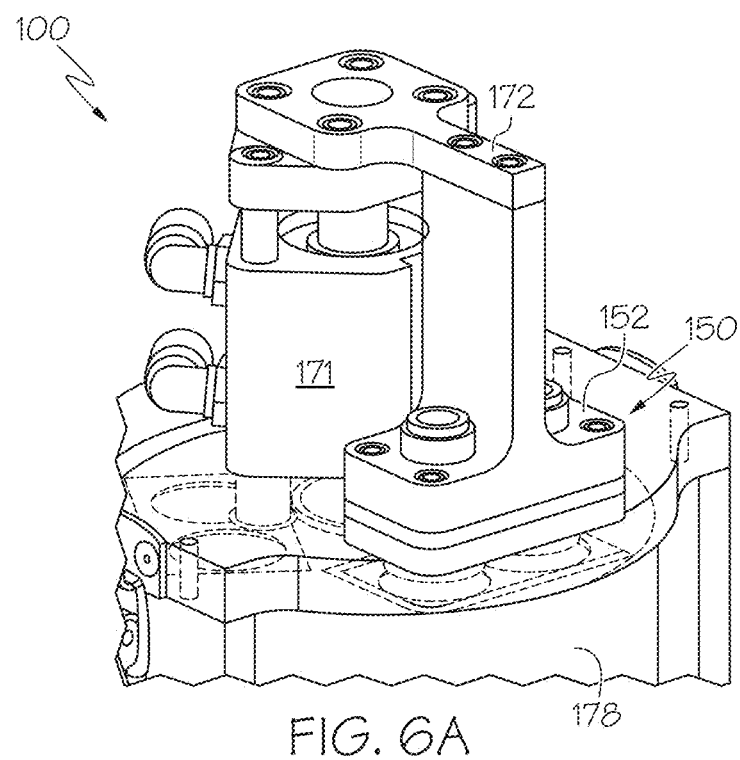
FIG. 6A is a schematic, perspective, view of a portion of the robot end effector of FIG. 1, showing a head assembly of the robot end effector, according to one or more examples of the subject matter, disclosed herein.
Figure 6B:
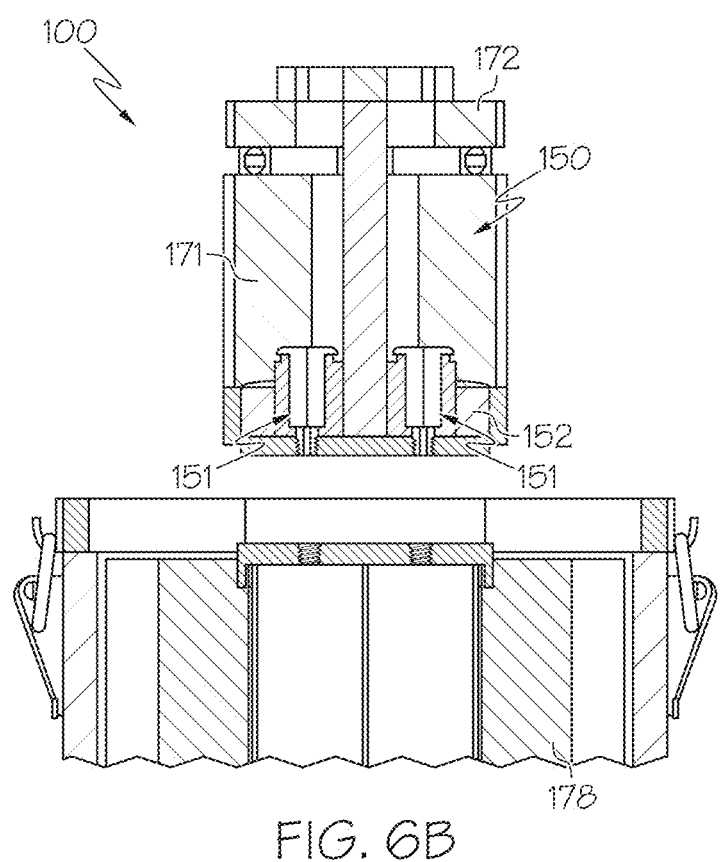
FIG. 6B is a schematic, perspective, view of a portion of the robot end effector of FIG. 1, showing a head assembly of the robot end effector, according to one or more examples of the subject matter, disclosed herein.
Figure 6C:
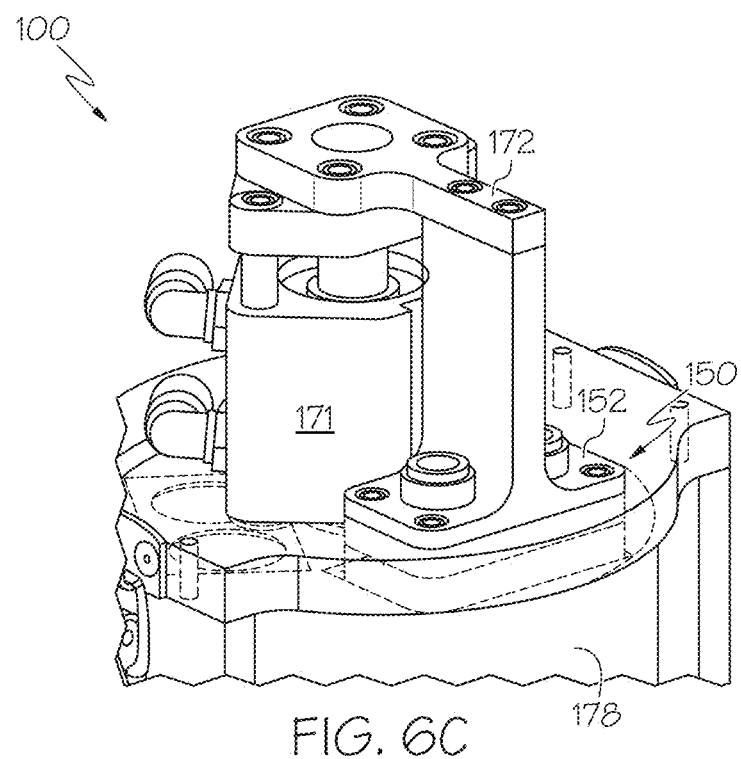
FIG. 6C is a schematic, front elevation view of a portion of the robot end effector of FIG. 1, showing a head assembly of the robot end effector, according to one or more examples of the subject matter, disclosed herein.
Figure 6D:
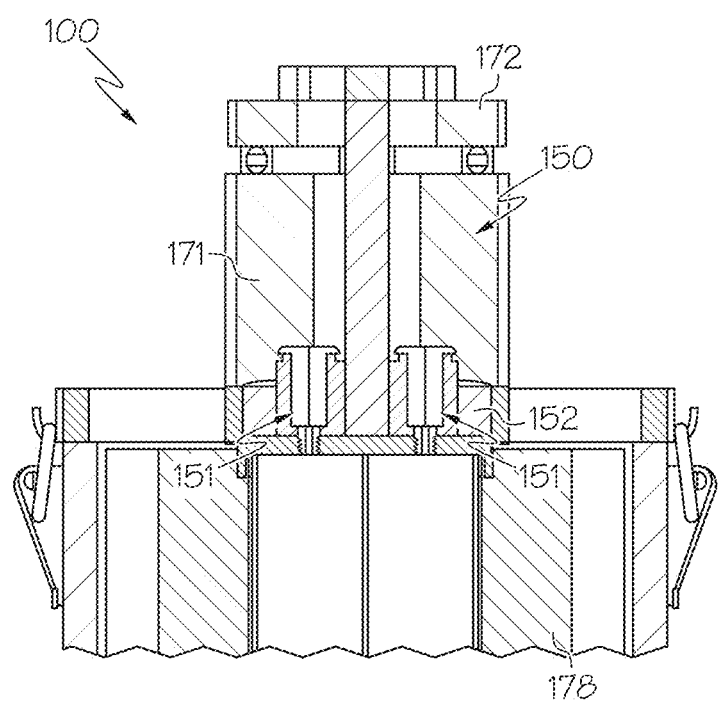
FIG. 6D is a schematic, front elevation view of a portion of the robot end effector of FIG. 1, showing a head assembly of the robot end effector, according to one or more examples of the subject matter, disclosed herein.

Referring generally to FIG. 1 and particularly to, e.g., FIG. 5, head assembly 150 is configured for attachment to, and detachment from, chassis 110, linearly along axis 190. The preceding portion of this paragraph delineates example twenty-six of the subject matter, disclosed herein, where example twenty-six also encompasses any one of examples one to twenty-five, above.

Attachment and detachment of head assembly 150 to and from chassis 110 enables two-part cartridges 104 to be inserted into cartridge bays 122.

Referring generally to FIG. 1 and particularly to, e.g., FIG. 5, head assembly 150 further comprises lips 111, and chassis 110 further comprises flexible clips 158. Each of flexible clips 158 is configured to receive one of lips 111 with a snap fit to attach head assembly 150 to chassis 110. The preceding portion of this paragraph delineates example twenty-seven of the subject matter, disclosed herein, where example twenty-seven also encompasses any one of examples one to twenty-six, above.

Attachment and detachment of flexible clips 158 to and from lips 111 enables attachment and detachment of head assembly 150 to and from chassis 110 and enables two-part cartridges 104 to be inserted into cartridge bays 122.

In one or more examples, lips 111 are a pair of lips and flexible clips 158 are a pair of flexible clips.

Referring generally to FIG. 1 and particularly to, e.g., FIG. 5, flexible clips 158 prevent head assembly 150 from moving relative to two-part cartridges 104. The preceding portion of this paragraph delineates example twenty-eight of the subject matter, disclosed herein, where example twenty-eight also encompasses example twenty-seven, above.

Flexible clips 158 prevent head assembly 150 from moving relative to two-part cartridges 104 to enable attachment of head assembly 150 to chassis 110.

Referring generally to FIG. 1 and particularly to, e.g., FIG. 5, cartridge bays 122 are oriented parallel to, and arranged in cylindrical profile 222 about, axis 190. Two-part cartridges 104 are received by cartridge bays 122, and first-part container 106 and second-part container 108 of each of two-part cartridges 104 are oriented side-by-side along a perimeter of cylindrical profile 222. The preceding portion of this paragraph delineates example twenty-nine of the subject matter, disclosed herein, where example twenty-nine also encompasses any one of examples one to twenty-eight, above.

Cylindrical profile 222 of cartridge bays 122 about axis 190 enables two-part cartridges 104 to rotate about axis 190. First-part container 106 and second-part container 108 of each of two-part cartridges 104 oriented side-by-side along a perimeter of cylindrical profile 222, provides efficient packing of two-part cartridges 104 within robot end effector 100 while enabling easy insertion and removal of two-part cartridges 104.

Referring generally to FIG. 1 and particularly to, e.g., FIG. 5, chassis 110 comprises first end 114 and second end 116, opposite first end 114 along axis 190, head assembly 150 extends from first end 114 of chassis 110, and dispensing valve 130 extends from second end 116 of chassis 110. The preceding portion of this paragraph delineates example thirty of the subject matter, disclosed herein, where example thirty also encompasses any one of examples one to twenty-nine, above.

Head assembly 150 extends from first end 114 of chassis 110 to enable easy insertion and removal of two-part cartridges 104, and dispensing valve 130 extends from second end 116 of chassis 110 to enable efficient deposition of extrudable substance 102 via valve outlet 134.

Different examples of the apparatus(es) and method(s) disclosed herein include a variety of components, features, and functionalities. It should be understood that the various examples of the apparatus(es) and method(s), disclosed herein, may include any of the components, features, and functionalities of any of the other examples of the apparatus(es) and method(s) disclosed herein in any combination.

Many modifications of examples, set forth herein, will come to mind of one skilled in the art, having the benefit of the teachings, presented in the foregoing descriptions and the associated drawings.

Therefore, it is to be understood that the subject matter, disclosed herein, is not to be limited to the specific examples illustrated and that modifications and other examples are intended to be included within the scope of the appended claims. Moreover, although the foregoing description and the associated drawings describe examples of the subject matter, disclosed herein, in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided herein.

The invention claimed is:

1. A robot end effect for dispensing an extrudable substance, the robot end effector comprising:
 a chassis;
 a mixer housing, extending from the chassis and configured to receive a static mixer, wherein:
  the static mixer comprises a mixer inlet and a mixer outlet, which is in fluidic communication with the mixer inlet; and
  the mixer housing is selectively movable, with respect to the chassis, linearly along an axis;
 cartridge bays, extending from the chassis, wherein:
  each of the cartridge bays is shaped to receive a corresponding one of two-part cartridges;
  each one of the two-part cartridges comprises a cartridge outlet;
  the cartridge bays are rotatable, with respect to the chassis, about the axis; and
  fluidic communication between the cartridge outlet of a corresponding one of the two-part cartridges and the mixer inlet is established when the cartridge bays are rotated about the axis to a predetermined orientation relative to the chassis and the mixer housing is translated along the axis relative to the chassis so that the cartridge outlet of a corresponding one of the two-part cartridges and the mixer inlet are fluidically coupled with each other;
 a dispensing valve, attached to the chassis and comprising a valve inlet and a valve outlet, wherein:
  the valve outlet is in selective fluidic communication with the valve inlet; and
  the valve inlet and the mixer outlet are configured to be in fluidic communication with each other; and
 a head assembly, comprising an inlet manifold, wherein:
  the inlet manifold is selectively movable, with respect to the chassis, linearly along the axis; and
  the head assembly is configured to selectively supply compressed air from a pressure source to contents of a selected one of the two-part cartridges via the inlet manifold when the two-part cartridges are received by the cartridge bays, the cartridge bays are in the predetermined orientation relative to the chassis, and the inlet manifold is translated along the axis so that the pressure source is capable of pressurizing the contents of the selected one of the two-part cartridges.

2. The robot end effector according to claim 1, wherein:
 the mixer housing is selectively movable, with respect to the chassis, linearly, along, the axis, between, inclusively, a mating location and a cleared location;
 when the mixer housing is in the mating location with respect to the chassis and the static mixer is received in the mixer housing, the mixer inlet of the static mixer is positioned for mating with the cartridge outlet of a corresponding one of the two-part cartridges, received by the cartridge bays; and
 when the mixer housing is in the cleared location with respect to the chassis, the mixer inlet is spaced away from the cartridge outlet of a corresponding one of the two-part cartridges.

3. The robot end effector according to claim 2, further comprising a first actuator, attached to the chassis and operable to move the mixer housing bi-directionally with respect to the chassis, linearly along the axis between the mating location and the cleared location with respect to the chassis.

4. The robot end effector according to Cairn 3, wherein:
 the first actuator comprises:
  a first actuator body;
  a bracket, fixed to the chassis; and
  at least one rail, fixed to the mixer housing and the first actuator body and oriented parallel to the axis; and
 at least the one rail, the first actuator body, and the mixer housing are coupled to the bracket and movable relative to the bracket linearly along the axis.

5. The robot end effector according to claim 3, wherein the first actuator is pneumatically activated.

6. The robot end effector according to claim 1, wherein the head assembly is arranged to connect pistons of any one of the two-part cartridges, associated with the cartridge outlet of a corresponding one of the two-part cartridges, in fluidic communication with the pressurization source.

7. The robot end effector according to claim 1, wherein the head assembly further comprises a supply valve, operable to selectively establish fluidic communication between the pressurization source and the inlet manifold.

8. The robot end effector according to claim 2, wherein the inlet manifold comprises a pair of fittings.

9. The robot end effector according to claim 8, wherein the head assembly further comprises a supply valve, operable to selectively establish fluidic communication between the pressurization source and a corresponding one of the pair of fittings.

10. The robot end effector according to claim 8, wherein
 the pair of fittings is movable, with respect to the chassis, linearly along the axis between a closed position and an open position,
 in the closed position, the pair of fittings is coupled with the selected one of the two-part cartridges, and
 in the open position, the pair of fittings is decoupled from the selected one of the two-part cartridges.

11. The robot end effector according to claim 10, further comprising a second actuator, attached to the head assembly and operable to selectively move the inlet manifold and the pair of fittings bi-directionally with respect to the head assembly, linearly along the axis between the closed position and the open position.

12. The robot end effector according to claim 11, wherein:
 the second actuator comprises:
  a second actuator body, fixed to the head assembly; and
  a bracket, fixed to the inlet manifold and to the pair of fittings,
 wherein the bracket, the inlet manifold, and the pair of fittings are coupled to the second actuator body and are movable relative to the second actuator body linearly along the axis.

13. The robot end effector according to claim 12, wherein the second actuator is pneumatically activated.

14. The robot end effector according to claim 10, further comprising a third actuator, attached to the chassis and operable to selectively rotate the cartridge bays with respect to the chassis, about the axis.

15. The robot end effector according to claim 14, wherein the third actuator is pneumatically activated.

16. The robot end effector according to claim 14, further comprising a rotating barrel, defining the cartridge bays.

17. The robot end effector according to claim 16, wherein the third actuator is operable to selectively rotate the rotating barrel to selectively move the cartridge bays, with respect to the chassis, about the axis.

18. The robot end effector according to claim 16, further comprising a fourth actuator, attached to the chassis and operable to rotationally lock the rotating barrel with respect to the chassis.

19. The robot end effector according to claim 18, wherein:
the fourth actuator comprises:
- a fourth actuator body, fixed to the chassis; and
- a locking pin, movably attached to the fourth actuator body; and the locking pin is movable relative to the fourth actuator body linearly along the axis to rotationally lock the rotating barrel with respect to the chassis.

20. The robot end effector according to claim 19, wherein:
the rotating barrel defines locking holes, and
the locking pin extends into one of the locking holes to rotationally lock the rotating barrel with respect to the chassis.

\* \* \* \* \*